(12) United States Patent
Petr

(10) Patent No.: US 6,327,163 B1
(45) Date of Patent: *Dec. 4, 2001

(54) SOLID STATE PULSED POWER SUPPLY

(75) Inventor: Rodney Petr, Acton, MA (US)

(73) Assignee: Science Research Laboratory, Inc., Somerville, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,548

(22) Filed: Apr. 27, 1999

(51) Int. Cl.$^7$ ...................................................... H02M 7/00
(52) U.S. Cl. ............................................. 363/124; 363/65
(58) Field of Search ............................... 363/124, 71, 65; 372/38; 307/106, 107, 108

(56) References Cited

U.S. PATENT DOCUMENTS

| | | | |
|---|---|---|---|
| 4,698,518 | * 10/1987 | Pacaia ................................... | 307/106 |
| 5,331,234 | * 7/1994 | Merritt et al. ....................... | 307/631 |
| 5,448,580 | * 9/1995 | Birx et al. ............................. | 372/38 |
| 5,682,303 | * 10/1997 | Goad ..................................... | 363/71 |
| 5,914,974 | * 6/1999 | Partlo et al. ........................... | 372/38 |
| 5,936,988 | * 8/1999 | Partlo et al. .......................... | 372/36 |

* cited by examiner

Primary Examiner—Peter S. Wong
Assistant Examiner—Gary L. Laxton

(57) ABSTRACT

A solid state power supply is provided which may be formed of a plurality of modules sufficient to support a selected voltage output from the supply. Each module includes a capacitor or capacitor bank for storing a high voltage, a thyristor switch through which the capacitor discharges, a trigger circuit for the thyristor switch and a nonlinear impedance element, preferably a saturable magnetic output stage, which initially provides a high impedance to current flow in a given direction, delaying significant current flow through the thyristor switch until there has been substantial spacial currents spread therein, and decrease as the current flow continues. The nonlinear impedance element also protects the thyristors and other elements of the power supply from voltage and current spikes generated by a nonlinear load. The thyristor switch is preferably made up of a plurality of series-connected thyristors and preferably includes various circuitry for voltage grading the thyristors and for otherwise protecting them from overload. The thyristors are preferably of a type with wide-area gate electrodes facilitating fast current rise time, preferably in the submicrosecond range. The power supply also preferably includes an energy snubber in parallel with the capacitor to dissipate reverse currents.

23 Claims, 2 Drawing Sheets

SOLID STATE PULSED POWER SUPPLY

FIELD OF THE INVENTION

This invention relates to solid state pulsed power supplies and more particularly to a high repetition rate, fast rise time solid state power supply capable of operating at voltages and currents in the kilovolt and kiloamp ranges respectively, and of driving nonlinear loads, including gas discharges, vacuum devices, and electromagnetic loads, as well as more conventional inductive, capacitive or resistive loads.

BACKGROUND OF THE INVENTION

There are many application in science, industry, military, and other fields, including driving large lasers, pulsed radar systems and various sources of electromagnetic radiation, where requirements exists for a power supply capable of producing pulses in the kilovolt and kiloamp range at high pulse repetition rates, for example 10 to 100 pulses per second (pps) with fast rise times in the microsecond range. While spark gap driven drivers have in the past been used in some such applications, such drivers are not capable of sustained operation at repetition rates of hundreds of pulses per second and, being spark gap devices, have relatively short lifetimes, requiring frequent servicing. Such devices are therefore not suitable for many applications in for example industry where millions of pulses may be generated in a single day and months, or even years, of service free operation are desired.

One way to achieve more reliable operation is to utilize an all solid state driver. However, it has not heretofore been possible to directly obtain the high rates of current rise required for such a power supply directly from solid state switches, and it has therefore been necessary to employ such solid state switching to discharge an energy storage capacitor through solid state switches at a slower rate consistent with the capacity of such switches and to then compress the pulse using for example non-linear magnetic or non-linear capacitive compression to obtain the desired fast rise times. However, such compression techniques are costly and bulky because the discharge energy must be stored within each stage of the pulse compression apparatus. A need therefore exists for an improved solid state pulsed power supply which is capable of providing kilovolt and kiloamp pulses at high repetition rates with fast pulse rise times on the order of kiloamps/microsecond, and, which power supply is capable of generating large numbers of pulses, in excess of $10^7$ and preferably substantially higher, without requiring servicing.

SUMMARY OF THE INVENTION

In accordance with the above, this invention provides a solid state power supply which includes a capacitor component connected to be charged from a high voltage source, a thyristor switch through which the capacitor component discharges, a trigger circuit for the thyristor switch and a nonlinear impedance element in series with the thyristor switch, the nonlinear impedance element initially providing a high impedance to current flow in a given direction, which impedance decreases as current flow continues. The nonlinear impedance element protects thyristors of the thyristor switch by delaying current flow through the thyristors of the switch until there has been substantial spacial current spread in the thyristors. The current capacity of the power supply may be enhanced by providing a plurality of power supply modules in parallel, each of which modules has a capacitor component charging though a thyristor switch connected in series with a nonlinear impedance element, the triggering circuit being operative to trigger the thyristor switches for all of the modules substantially simultaneously.

For preferred embodiments, the thyristor switch includes a plurality of thyristors connected in series, the number of thyristors being sufficient to support a selected voltage output from the power supply. Circuitry is also provided for maintaining a substantially equal voltage across each of the thyristors. For these embodiments, the trigger circuit simultaneously applies trigger pulses to each of the thyristors. The switch preferably includes resistive and capacitive grading elements across each thyristor to assure equal voltages thereacross, and preferably also includes circuitry which protects the thyristors from being overloaded. The overload protection circuit may for example include a surge suppressor across each thryistor. The overload protect circuit may also include a monitor for each thyristor, triggering being aborted if an abnormal voltage is detected across a thyristor by a corresponding monitor.

Each thyristor is preferably of a type with wide area gate electrodes facilitating fast current rise times which are preferably in the submicrosecond range. The nonlinear impedance element is preferably a saturable magnetic output stage which preferably includes at least one serially connected ferrite core and a reset circuit to ensure that each core is in its high impedance unsaturated state before the resistor switch is triggered. The saturable magnetic output stage may also include a cylindrical conductor passing through a center of each ferrite core and a coaxial return conductor surrounding the cores, with both the cylindrical conductor and the return conductor being in close proximity to the cores so as to maximize saturated inductance of the output stage. The reset circuit for the output stage preferable includes a series connected low pass filter.

The power supply also preferably includes an energy snubber in parallel with the capacitor component which snubber may include at least one series connected, fast recover diode in series with at least one series connected low inductance resistor. An energy recovery circuit may be substituted for the resistor, which circuit stores energy applied thereto and transfers the stored energy to the capacitor component before triggering of the thyristor switch. The power supply may also include a mechanism which cools at least selected components of the power supply, low inductance current returns surrounding the components of the power supply to reduce the overall inductance thereof and/or a pulse sharpening stage which is preferably in the form of a capacitor component across the output of the thyristor switch.

The foregoing and other objects, features and advantages of the invention will be apparent from the following more particular description of a preferred embodiment of the invention as illustrated in the accompanying drawings.

DRAWINGS

DETAILED DESCRIPTION

Figure 1:
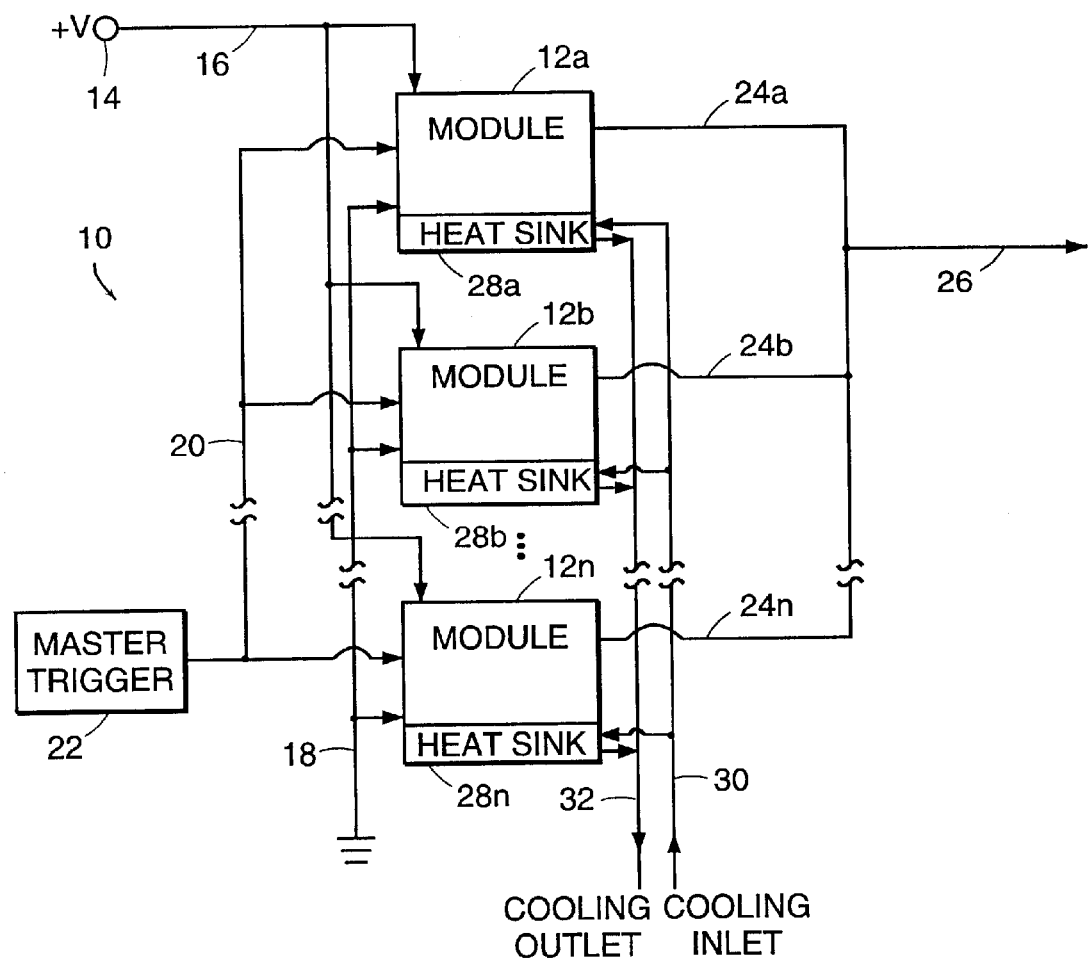
FIG. 1 is a schematic block diagram of a solid state power supply in accordance with the teachings of this invention.

Referring to FIG. 1, a power supply 10 is shown which includes N modules 12a–12n, three of which are shown in the figure. The number of modules 12 in a given power supply is determined by the required output current from power supply 10, and might for example be twelve for an application requiring outputs in the 100 kA range. Each module has a voltage applied thereto from a suitable source 14 over a line 16 and has a ground potential applied thereto over for example line 18. While for purposes of illustration, a common ground line 18 is shown for all the modules in FIG. 1, each module may instead be individually grounded. Source 14, while shown as being a positive voltage source in FIG. 1, might, in suitable applications, be a negative voltage source. The voltage from source 14 may for example be 8–10 kv for an illustrative example where the power supply is being utilized to drive a high energy radiation source, and may be substantially higher, in the 10 s of kilovolt range, for other applications. Source 14 may for example be a high voltage switching or command charging system which is capable of switching rapidly (i.e., in the 100 μs range).

An additional input to each module 12 is an output on line 20 from master trigger circuit 22. As will be discussed later, the signal on line 20 is utilized to trigger thyristors in each module and, for preferred embodiments, line 20 is an optical fiber having optical triggering pulses passed therethrough. The triggering of thyristors for all modules 12 from a common master trigger source 22 assures that output pulses from the module 12a–12n are generated substantially simultaneously on lines 24a–24n so that their effects are cumulative, providing a desired output current on circuit output line 26.

Because, as will be discussed later, the various components in each module 12 operate at significant voltages and currents, various components in each module can heat excessively and it is desirable that an effective mechanism be provided for removing such heat so as to prevent potential damage to module components. FIG. 1 illustrates one such mechanism wherein a heat sink 28a–28n of a suitable thermally conducting material is in thermal contact, either directly or indirectly, with components of the corresponding module which are to be cooled and heat is removed from each heat sink 28 by flowing a cooling fluid such as water therethrough, the cooling fluid entering the heat sink over a line 30 and exiting the heat sink over a line 32. Other techniques of cooling known in the art or hereafter developed may be utilized for cooling at least selected components of each module 12, including flowing denaturized water, oil, air or some other electrically nonconducting fluid through the module, or at least selected portions thereof, to cool at least selected module components.

Figure 2:
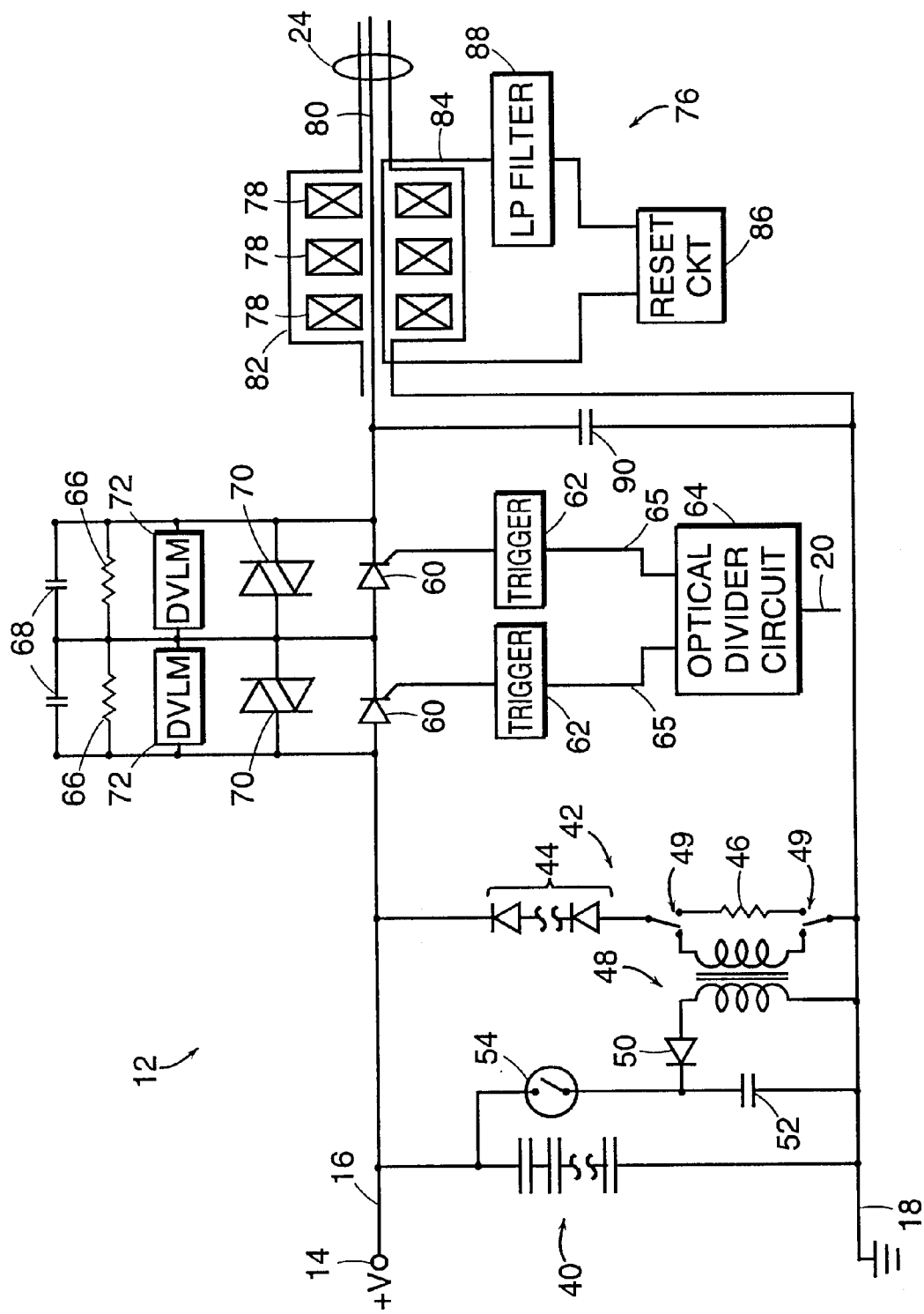
FIG. 2 is a schematic diagram of a single module suitable for use in the power supply of FIG. 1.

FIG. 2 is a schematic diagram of a single module 12 suitable for use in the power supply of FIG. 1, cooling mechanisms not being shown in FIG. 2 to simplify the drawing. Common elements in the two figures have the same reference numeral. Thus, referring to FIG. 2, it is seen that a capacitor bank 40 is connected between lines 16 and 18 to be charged by the positive potential on line 16. Capacitor bank 40 is large enough so as to be able to store required energy to be outputted from the power supply, and voltages which may in some applications be in the kilovolt or 10 s of kilovolt range. For an illustrative embodiment, capacitor bank 40 can be recharged in around 100 μs and source 14 is selected to provide charging voltage for this period.

An energy snubber circuit 42 is also connected across lines 16 and 18, the snubber circuit including voltage-graded stacks of fast recovery diodes 44 in series with stacks of low inductance resistors 46. Where it is desired to not only snub or waste reverse flow energy in resistor stack 46, a transformer 48 is provided, the primary of which may be switched by solid state switches 49 to be connected in lieu of resistor 46 and the secondary of which is connected through a diode 50 across a suitable capacitor or capacitor bank 52. As will be discussed later, recovered energy in capacitor 52 is permitted to flow through electronic switch 54, for example a thyristor, when switch 54 is closed to further charge capacitor bank 40.

Capacitor bank 40 discharges through an output switch consisting of a stack of thyristors 60 connected in series. While only two thyristors are shown in FIG. 2, the number of thyristors in the stack is sufficient so as to be able to withstand the capacitor discharge voltage, or in other words the voltage output required from the module. A typical module might for example have three thyristors 60 connected in series. Thyristors 60 are preferably of a relatively new type of such devices having wide area gate electrodes which facilitates fast current rise time (in the order of under 1 microsecond), an example of such a thyristor being an HCT 85 mm thyristor from ABB Corp. Thyristors of this type have for example been used for high power motor controls and traction engine application.

Each thyristor 60 has a corresponding triggering circuit 62 which responds to a signal, for example an optical signal, from master trigger circuit 22 on line or fiber 20 received at the triggering circuit through an optical divider circuit 64 and lines 65. This assures substantially simultaneous triggering of all of the thyristors not only in a given module 12, but in the entire power supply 10. Trigger circuits 62 convert the optical inputs of lines 65 to fast rising trigger pulses. Thyristor trigger jitter times of less than 20 nanoseconds are easily achieved.

Thyristors 60 and trigger circuits 62 are resistively and capacitively voltage graded by resistors 66 and capacitors 68 connected across corresponding thyristors 60 to insure equal voltage across each thryistor, whether or not the voltage across the stack is steady or changing rapidly, as happens during discharge of capacitor bank 40. Such grading may be effected by having one pole of each thyristor share a common ground with the corresponding trigger circuit 62, the common ground for example being provided by a chill plate between adjacent thyristors, and preferably in contact therewith, which plate is tied to a ground plane. However, should one or more thyristors fail to fire on triggering from a circuit 62, the grading would not be able to maintain equal voltage across the individual thyristors and those that fail to fire would be subject to possibly destructive over voltages. In order to prevent such destruction, silicon surge suppressors 70 are provided across each thyristor. Finally, a diagnostic voltage level monitor 72 is provided across each thyristor which is connected to suitable controls and may be operative to abort or inhibit triggering of a thyristor if voltages across the thyristor are out of range. This further assures against damage to the thyristors 60, a part which is relatively expensive and time consuming to replace.

Finally, each module 12 has a saturable magnetic output stage 76 which performs a number of functions, including protecting the thyristors during early phase of current flow and preventing back voltages from being impressed on the thyristors. Output stage 76 is formed of a plurality of ferrite cores or toroids 78 which may be in a saturated or unsaturated state. When in an unsaturated state, the cores present a high impedance to pulses outputted from the thyristor switch while when saturated, the cores present a low impedance to such signals. A cylindrical conductor 80 connected to the output from the thryistor switch passes through a central hole of each stacked core 78 and a grounded coaxial return conductor 82 surrounds cores 78. Conductors 80 and 82 are preferably in close proximity to the stack of ferrite cores so as to minimize the saturated inductance of the output stage and form coaxial output line 24 from module 12.

A reset current conductor or line 84 also passes through the stack of ferrite cores and has a reset current pulse applied thereto by a reset circuit 86 before master trigger circuit 22 is operated so as to insure that all of the cores 78 are in their high impedance unsaturated state when triggering of thyristors 60 occurs. A suitable reactive low pass filter 88 is provided in reset line 84 so that any high frequency inductively coupled pulse between the module output and core reset line 76 is sufficiently attenuated so as not to damage reset circuit 86.

Finally, the module 12 may include a pulse sharpening stage in the form of a capacitor or capacitor bank 90 connected across lines 16, 18 ahead of output stage 76. The capacitance of this stage is selected to achieve the functions described later and is generally substantially less than that of the capacitor 40, but substantially greater than that of the load.

In operation, a DC current from command charging system 14 is initially applied to charge capacitor bank 40 to a desired voltage level, which may be in the kilovolt range. Immediately prior to the issue of a trigger signal from the master trigger 22, the command charging process is interrupted. Either while capacitor bank 40 is charging or once its charging is complete, a reset pulse is applied by circuit 86 to reset line 84 to reset all of the ferrite cores 78 to their high impedance unsaturated state.

Once these preliminary operations have been completed, master trigger circuit 22 is operated to apply a trigger signal through line 20 to all of the modules 12a–12n. This operates the individual trigger circuits 62 to trigger each corresponding thyristor 60. As indicated earlier, since the thyristors not firing simultaneously, or one of the thyristors not firing at all as a result of a command applied thereto, results in a larger percentage of the total voltage being across a late fired or unfired thyristor, which can result in a voltage overload on the thyristor, and thus in the destruction of the thyristor, various safeguards are provided in the circuit to prevent this from happening. In particular, by operating the triggering circuits 62 off of a common trigger signal 20, simultaneous firing of the thyristors is facilitated. Resistive and capacitive grading element 66, 68 maintain equal voltages over some small variations, and surge suppressors 70 kick in to protect for larger variations. Finally, voltage monitors 72 can detect voltage overload on a given thyristor, or other voltage abnormalities in the module and can abort firing of the thyristors in response to such an abnormality detection to further protect the thyristors from destruction.

Another potential problem is that, even with the wide area gate electrodes of the thyristors utilized, triggering still initiates current flow on a small area of the electrodes which area spatially increases over a relatively short time period; however, it is desirable that substantial current flow not occur in the thyristors until the current flow has spread over a substantial area of the thyristor electrodes in order to prevent current densities on the electrodes from reaching potentially damaging levels. This current delay function is accomplished by saturable magnetic output stage 76. In particular, cores 78 initially being in their high impedance unsaturated state prevent significant initial current flow after the triggering of thyristors 60. As cores 78 saturate, the current flow builds up and the parameters of the components can be selected such that, by the time cores 78 saturate, permitting full current flow through thyristors 60, current has spatially spread on the electrodes sufficiently so that potentially damaging current densities do not occur. The delay in significant current output from the thyristor switches 60 introduced by stage 76 also sharpens the leading edge of the output pulse from module 12, resulting in the sharp rise time, microsecond pulses which are desired without requiring pulse compression stages and while still permitting the use of thyristor switches which would not otherwise provide the desired fast rise time pulses.

There is also a possibility that once capacitor bank 40 has become fully discharged, a back voltage may be impressed on the power supply from for example the load to which the pulse was applied. The resulting reverse current flow through thyristors 60 could be damaging to these and other power supply components. However, since cores 78 are saturated at this time for current flow in the forward direction, application of a back voltage rapidly moves these cores into a high impedance state which impedes substantial reverse current flow. While if reverse current flow were to last long enough, cores 78 would ultimately become saturated in the reverse direction, the components are selected so that this does not occur, thereby protecting the module against damage from reverse current flow.

In many applications of this invention, the dissipation of the load will not be sufficient to critically damp the circuit. Under these conditions, and in the absence of a snubbing circuit 42, the capacitor bank 40 acquires a reverse voltage. This reverse voltage reaches a maximum value when the current goes through zero. The reverse voltage is dropped across the cores 78, and these cores, now in an unsaturated state with respect to reverse current, present a high impedance to reverse current flow. However, the cores eventually saturate, thereby allowing the full reverse voltage to be applied to the thyristors. Application of reverse voltage could result in reverse current flow and result in damage to the thyristors.

The problem of current reversal is avoided by the inclusion of the snubber circuit 42 consisting of stacks of diodes 44 and resistors 46 in series. As soon as the voltage across capacitor bank 40 begins to reverse, current can flow through resistor 46, with the combined result that the peak excursion of reverse voltage is diminished and any energy stored due to reverse charging of capacitor bank 40 is dissipated without a reverse flow of current through the load. The elimination of reverse flow of current through the load is valuable or even critical for some applications in which this invention may be applied.

To the extent it is desired to reclaim energy flowing through snubbing circuit 42, a transformer 48 having substantially lower impedance than resistor stack 46 is substituted for resistor stack 46, either in the initial circuit or by operating switches 49, allowing the reverse current flowing through the primary of this transformer to charge capacitor 52. Either before, during or after the charging of capacitor bank 40 from source 14, switch 54 may be closed to permit capacitor 52 to discharge, supplementing the energy applied to capacitor bank 40. However, since the reverse energy dissipated in resistor 46 is generally small compared to the total charge applied to capacitor bank 40, recovery circuit 48–54 is not normally utilized and the reverse current is merely dissipated in resistor stack 46.

Once the above sequence of operations has been completed, the module is ready to begin a new pulse generation cycle, starting with the charging of capacitor bank 40. A circuit capable of generating kilovolt and kiloamp pulses with fast rise time and microsecond duration has therefore been provided. Since the circuit uses high reliability, all solid state components, it is also capable of producing pulse repetition rates in the 10 s or even 100 s of pps with reliability in the range of $10^{10}$ pulses between servicing/failure. For an illustrative embodiment, the circuit operates in the 10 s of kilovolts and 100 s of kiloamp ranges, with a PRF of over 100 Hertz and trigger timing jitter of less than 20 ns.

While the circuits of FIGS. 1 and 2 are capable of generating microsecond pulses which are sufficiently short for most applications, where shorter pulses, for example pulses in the nanosecond range, are required, the circuit of FIG. 1 and/or FIG. 2 could be utilized as a front end to a pulse compression stage of the type shown for example in U.S. Pat. No. 5,142,166, which patent is owned by the assignee of this invention. Further, placing capacitor 90 before the saturable magnetic stage 76 provides a pulse sharpening stage. The capacitor 90 serves two purposes; first, it aids the thyristors 60 in turning on by providing a small displacement current through the thyristors before the magnetic cores 78 saturate and the main pulse current flows. Second, capacitor 90 serves as a fast discharge circuit for producing fast voltage and current rise time pulses into the load. In addition, while output stage 76 has been shown as a saturable magnetic output stage, a suitable varying inductance/saturable capacitive stage might also be utilized and is within the contemplation of the invention. Other variations in the components utilized for performing various functions are also possible. Thus, while the invention has been particularly shown and described above with reference to a preferred embodiment, the foregoing and other changes in form and detail may be made therein by one skilled in the art while still remaining withing the spirit and scope of the invention, which is to be defined only by the appended claims.

What is claimed:

1. A solid state power supply including:
   a capacitor component connected to be charged from a high voltage source;
   a thyristor switch through which said capacitor component discharges;
   a trigger circuit for said thyristor switch, there being a time period between triggering of said switch by said trigger circuit and when said switch should pass full current discharge from said capacitor; and
   a non-linear impedance output stage for said thyristor switch, said output stage providing an initial high impedance to forward current flow through the switch to a load, said impedance decreasing during said time period to permit substantially full current flow through said stage at the end of said period, and, once full current flow is permitted, providing a substantially continuing high impedance to any back current from said load as a result of the current applied to said load by said power supply.

2. A power supply as claimed in claim 1 wherein the current capacity of the power supply is enhanced by providing a plurality of power supply modules in parallel, each of said modules having a said capacitor component discharging through a said thyristor switch connected in series with a non-linear impedance output stage, said trigger circuit being operative to substantially simultaneously trigger the thyristor switches for all said modules.

3. A power supply as claimed in claim 1 wherein said thyristor switch includes a plurality of thyristors connected in series, the number of said thyristors being sufficient to support a selected voltage output from the power supply, and circuitry for maintaining substantially equal voltages across each of said thyristors.

4. A power supply as claimed in claim 3 wherein said trigger circuit simultaneously applies trigger pulses to each of said thyristors.

5. A power supply as claimed in claim 3 wherein said switch includes resistive and capacitive voltage grading elements across each thyristor to assure equal voltage thereacross.

6. A power supply as claimed in claim 3 including circuitry which protects said thyristors from being overloaded.

7. A power supply as claimed in claim 6 wherein said overload protect circuitry includes a surge suppressor across each thyristor.

8. A power supply as claimed in claim 6 wherein said overload protect circuitry includes a monitor for each thyristor, triggering being aborted if an abnormal voltage is detected across a thyristor by a corresponding said monitor.

9. A power supply as claimed in claim 3 wherein each said thyristor is of a type with wide area gate electrodes facilitating fast current rise time.

10. A power supply as claimed in claim 9 wherein the current rise time for said thyristors is submicrosecond.

11. A power supply as claimed in claim 1 wherein said non-linear impedance output stage includes at least one saturable element.

12. A power supply as claimed in claim 11 wherein said at least one saturable magnetic element includes at least one series connected ferrite core; and including a reset circuit to insure that said at least one core is in its high impedance unsaturated state before said thyristor switch is triggered.

13. A power supply as claimed in claim 12 wherein said output stage includes a cylindrical conductor passing through a center of said at least one ferrite core, and a coaxial return conductor surrounding said at least one core, both the cylindrical conductor and the return conductor being in close proximity to the at least one core so as to minimize saturated inductance of the output stage.

14. A power supply as claimed in claim 12 wherein said reset circuit includes a series connected low pass filter.

15. A power supply as claimed in claim 1 including an energy snubber in parallel with said capacitor component.

16. A power supply as claimed in claim 15 wherein said energy snubber includes at least one series-connected, fast-recovery diode in series with at least one, series connected, low inductance resistor.

17. A power supply as claimed in claim 15 wherein said energy snubber includes an energy recovery circuit which stores energy applied thereto and transfers the stored energy to said capacitor component before triggering of said thyristor switch.

18. A power supply as claimed in claim 1 including a mechanism which cools at least selected components of said power supply.

19. A power supply as claimed in claim 1 including a pulse sharpening stage in the form of a capacitor component across the output of said thyristor switch.

20. A power supply as claimed in claim 1 wherein outputs from said power supply are in the kilovolt and kiloamp ranges, with a PRF of at least 10 Hertz.

21. A power supply as claimed in claim 20 wherein said outputs are in the 10 s of kilovolt and 100 s of kiloamp ranges, with a PRF of at least 100 Hertz.

22. A power supply as claimed in claim 1 wherein said power supply has a trigger timing jitter of less than 20 ns.

23. A power supply as claimed in claim 1 wherein said thyristor has a fast current rise time in the order of 100 KA/microsecond.

* * * * *